United States Patent
Osterman

(10) Patent No.: US 6,463,924 B1
(45) Date of Patent: Oct. 15, 2002

(54) GREASE COLLECTION DEVICE FOR A GRILL

(76) Inventor: Kevin J. Osterman, 7800 Jackson Way, Buena Park, CA (US) 90620

( * ) Notice: Subject to any disclaimer, the term of this patent is extended or adjusted under 35 U.S.C. 154(b) by 0 days.

(21) Appl. No.: 10/014,208

(22) Filed: Nov. 9, 2001

(51) Int. Cl.[7] .............................. F24C 3/00; F24C 15/14
(52) U.S. Cl. ..................... 126/41 R; 126/25 R; 126/51; 99/446
(58) Field of Search .............................. 126/41 R, 25 R, 126/51, 9 R, 9 B, 25 C, 37 B, 41 D; 99/444, 445, 446; D7/402

(56) References Cited

U.S. PATENT DOCUMENTS

| | | | |
|---|---|---|---|
| 4,140,889 A | * | 2/1979 | Mason, Jr. et al. ........... 99/444 |
| D253,804 S | | 1/1980 | Wandel |
| 4,574,770 A | | 3/1986 | Wells |
| 5,325,843 A | | 7/1994 | Bravata |
| 5,566,606 A | | 10/1996 | Johnston |
| 5,806,510 A | | 9/1998 | Fischer et al. |
| 6,053,160 A | | 4/2000 | Scarborough |
| D436,498 S | * | 1/2001 | Carlson et al. .............. D7/402 |
| 6,237,472 B1 | * | 5/2001 | Gates ........................ 126/25 R |
| 6,247,468 B1 | * | 6/2001 | Wood ........................ 126/41 R |

* cited by examiner

Primary Examiner—James C. Yeung

(57) ABSTRACT

A grease collection device for a grill for catching grease falling from an open grill cover. The device includes a bottom wall which is elongate and has a first end edge, a second end edge, a first side edge and a second side edge. A first vertical wall is attached to and extends along the length of the first side edge. A second vertical wall is attached to and extending along the length of the second side edge. A hook member is attached to and extends along a length of an upper edge of the first vertical wall. A cup member has a base wall and a peripheral wall. The peripheral wall has a top edge defining an opening into the cup member. The top edge is attached to the second end edge such that the opening is generally within a plane of the bottom wall.

2 Claims, 2 Drawing Sheets

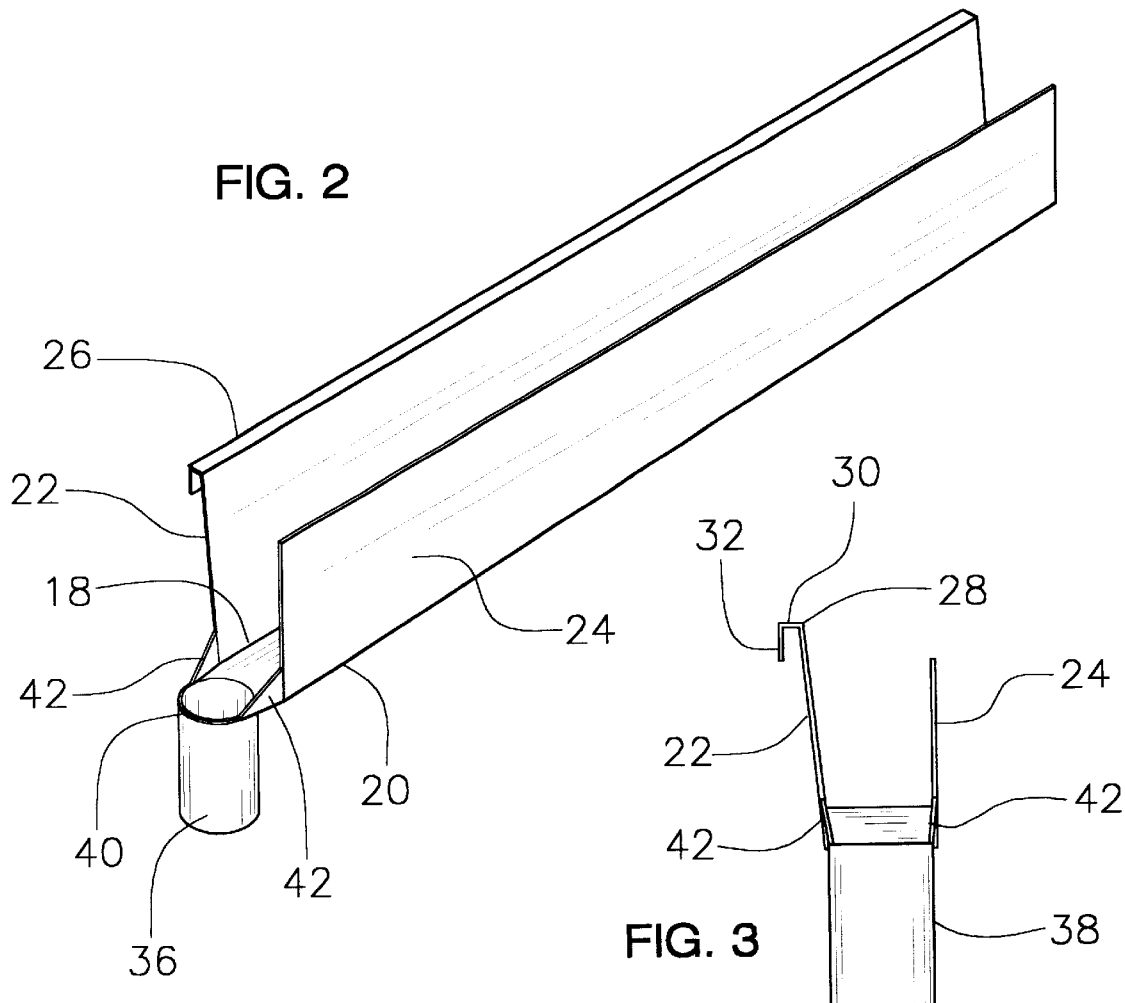
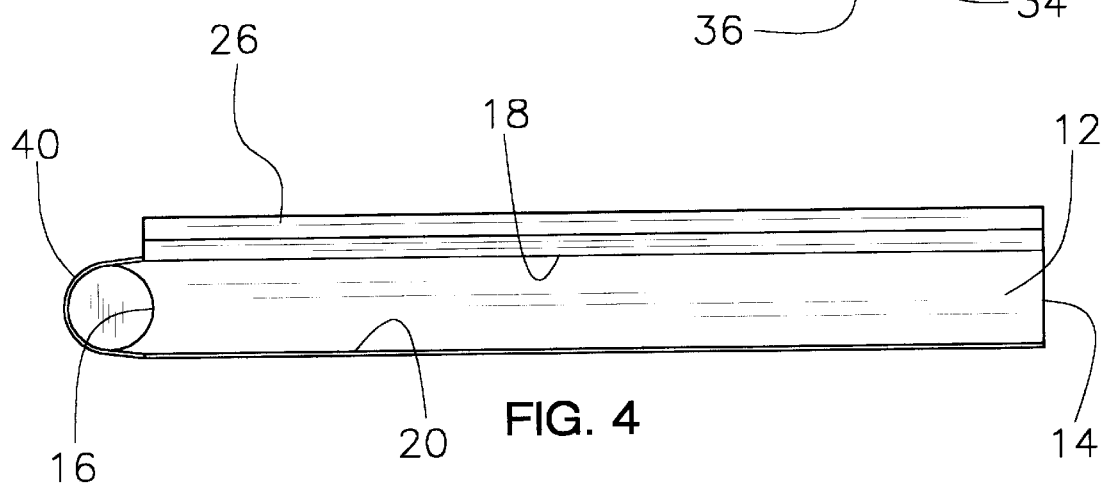

GREASE COLLECTION DEVICE FOR A GRILL

BACKGROUND OF THE INVENTION

1. Field of the Invention

The present invention relates to grease traps and more particularly pertains to a new grease collection device for a grill for catching grease falling from an open grill cover.

2. Description of the Prior Art

The use of grease traps is known in the prior art. More specifically, grease traps heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 6,053,160; 5,566,606; 5,806,510; 5,325,843; 4,574,770; and U.S. Des. Pat. No. 253,804.

While these devices fulfill their respective, particular objectives and requirements, the aforementioned patents do not disclose a new grease collection device for a grill. The inventive device includes a bottom wall which is elongate and has a first end edge, a second end edge, a first side edge and a second side edge. A first vertical wall is attached to and extends along the length of the first side edge. A second vertical wall is attached to and extending along the length of the second side edge. A hook member is attached to and extends along a length of an upper edge of the first vertical wall. A cup member has a base wall and a peripheral wall extending upwardly from the base wall. The peripheral wall has a top edge defining an opening into the cup member. The top edge is attached to the second end edge such that the opening is generally within a plane of the bottom wall.

In these respects, the grease collection device for a grill according to the present invention substantially departs from the conventional concepts and designs of the prior art, and in so doing provides an apparatus primarily developed for the purpose of catching grease falling from an open grill cover.

SUMMARY OF THE INVENTION

In view of the foregoing disadvantages inherent in the known types of grease traps now present in the prior art, the present invention provides a new grease collection device for a grill construction wherein the same can be utilized for catching grease falling from an open grill cover.

The general purpose of the present invention, which will be described subsequently in greater detail, is to provide a new grease collection device for a grill apparatus and method which has many of the advantages of the grease traps mentioned heretofore and many novel features that result in a new grease collection device for a grill which is not anticipated, rendered obvious, suggested, or even implied by any of the prior art grease traps, either alone or in any combination thereof.

To attain this, the present invention generally comprises a bottom wall which is elongate and has a first end edge, a second end edge, a first side edge and a second side edge. A first vertical wall is attached to and extends along the length of the first side edge. A second vertical wall is attached to and extending along the length of the second side edge. A hook member is attached to and extends along a length of an upper edge of the first vertical wall. A cup member has a base wall and a peripheral wall extending upwardly from the base wall. The peripheral wall has a top edge defining an opening into the cup member. The top edge is attached to the second end edge such that the opening is generally within a plane of the bottom wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new grease collection device for a grill apparatus and method which has many of the advantages of the grease traps mentioned heretofore and many novel features that result in a new grease collection device for a grill which is not anticipated, rendered obvious, suggested, or even implied by any of the prior art grease traps, either alone or in any combination thereof.

It is another object of the present invention to provide a new grease collection device for a grill which may be easily and efficiently manufactured and marketed.

It is a further object of the present invention to provide a new grease collection device for a grill which is of a durable and reliable construction.

An even further object of the present invention is to provide a new grease collection device for a grill which is susceptible of a low cost of manufacture with regard to both materials and labor, and which accordingly is then susceptible of low prices of sale to the consuming public, thereby making such grease collection device for a grill economically available to the buying public.

Still yet another object of the present invention is to provide a new grease collection device for a grill which provides in the apparatuses and methods of the prior art some of the advantages thereof, while simultaneously overcoming some of the disadvantages normally associated therewith.

Still another object of the present invention is to provide a new grease collection device for a grill for catching grease falling from an open grill cover.

Yet another object of the present invention is to provide a new grease collection device for a grill which includes a bottom wall which is elongate and has a first end edge, a second end edge, a first side edge and a second side edge. A first vertical wall is attached to and extends along the length of the first side edge. A second vertical wall is attached to and extending along the length of the second side edge. A hook member is attached to and extends along a length of an upper edge of the first vertical wall. A cup member has a base wall and a peripheral wall extending upwardly from the base wall. The peripheral wall has a top edge defining an opening into the cup member. The top edge is attached to the second end edge such that the opening is generally within a plane of the bottom wall.

Still yet another object of the present invention is to provide a new grease collection device for a grill that is easily retrofitted to existing grills to prevent grease and other liquids coating an inner surface of a lid from falling outside of the grill and onto a ground or deck surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective view of the present invention.

FIG. 3 is a schematic side view of the present invention.

FIG. 4 is a schematic top view of the present invention.

DESCRIPTION OF THE PREFERRED EMBODIMENT

Figure 1:
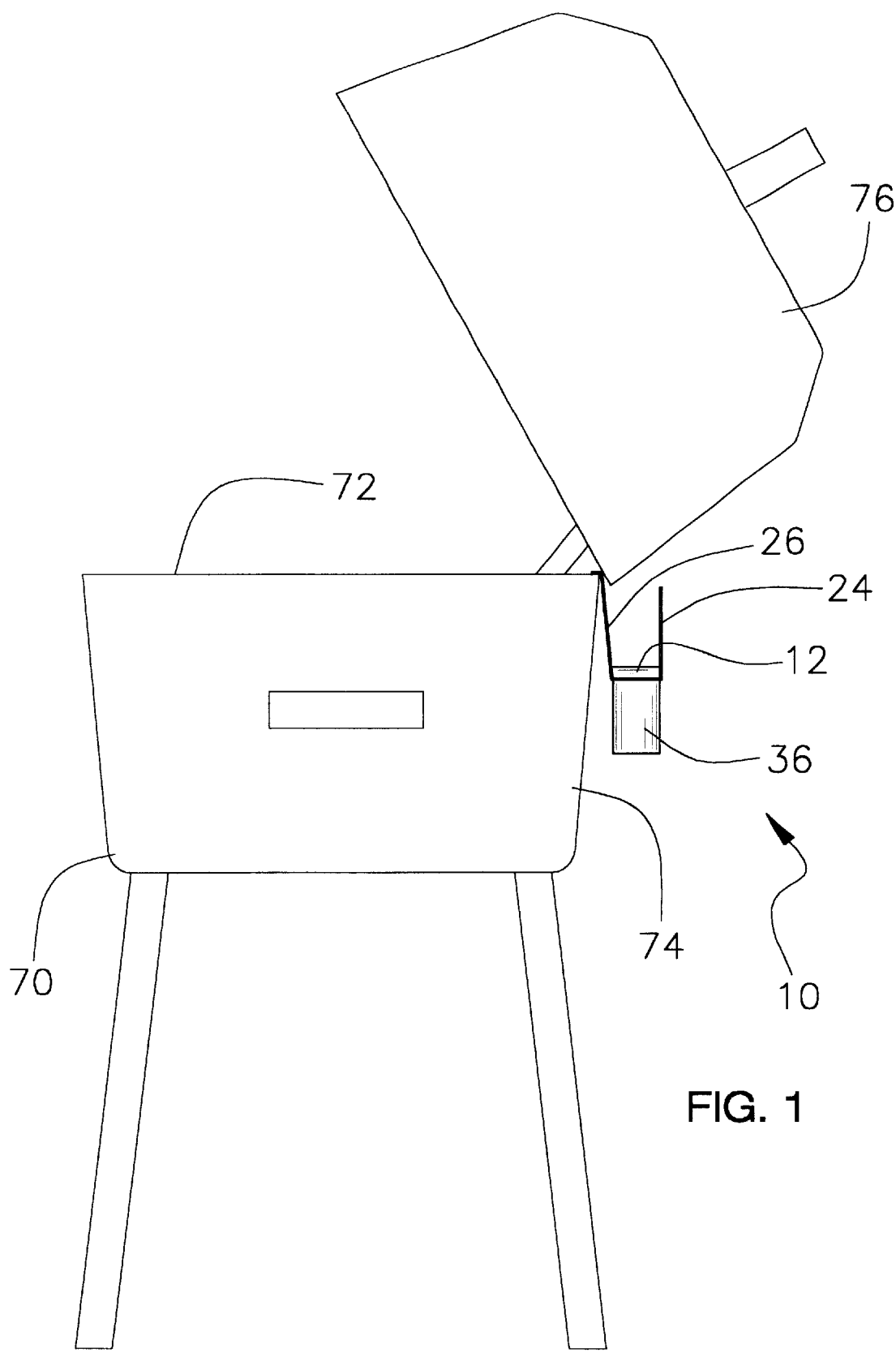
FIG. 1 is a schematic side view of a new grease collection device for a grill according to the present invention.

With reference now to the drawings, and in particular to FIGS. 1 through 4 thereof, a new grease collection device for a grill embodying the principles and concepts of the present invention and generally designated by the reference numeral 10 will be described.

As best illustrated in FIGS. 1 through 4, the grease collection device for a grill 10 generally comprises a bottom wall 12 that is elongate and has a first end edge 14, a second end edge 16, a first side edge 18 and a second side edge 20. A first vertical wall 22 is attached to and extends along the length of the first side edge 18. A second vertical wall 24 is attached to and extends along the length of the second side edge 20. The first vertical wall 22 has an increasing height from the first end edge 14 to the second end edge 16.

A hook member 26 is attached to and extends along a length of an upper edge 28 of the first vertical wall 22. The hook member 26 includes a horizontal portion 30 attached to and extending away from the vertical wall 22 and a vertical portion 32 attached to the horizontal portion 30 and extending downward from the horizontal portion 30. The horizontal portion 30 may be abutted against a lip 72 of a grill 70 such that a wall 74 of the grill 70 is positioned between the vertical portion 32 and the first vertical wall 22.

A cup member 34 has a base wall 36 and a peripheral wall 38 extending upwardly from the base wall 36. The peripheral wall 38 has a top edge 40 defining an opening into the cup member 34. The top edge 40 is attached to the second end edge 16 such that the opening is generally within a plane of the bottom wall 12. Ideally, the bottom wall 12 slopes downward toward the cup member 34. Each a pair of guide walls 42 extends between the top edge 40 of the cup member 34 and one of the first 22 and second 24 vertical walls.

In use, the hook member 26 is positioned over the lip 72 of the grill 70 under the cover 76 of the grill 70 such that grease in the cover drips into the device 10. The bottom wall 12 is angled downward from the first end edge to the second end edge when the hook member 26 is positioned over the lip 72 of the grill 70 such that grease on the bottom wall 12 flows into the cup member 36. The grease may then be poured out of the cup member 36 by the user as needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grease trap device for positioning over the lip of a grill, said device comprising:

a bottom wall being elongate and having a first end edge, a second end edge, a first side edge and a second side edge, a first vertical wall being attached to and extending along the length of said first side edge, a second vertical wall being attached to and extending along the length of said second side edge;

a hook member being attached to and extending along a length of an upper edge of said first vertical wall;

a cup member having a base wall and a peripheral wall extending upwardly from said base wall, said peripheral wall having a top edge defining an opening into said cup member, said top edge being attached to said second end edge such that said opening is generally within a plane of said bottom wall;

wherein said first vertical wall has an increasing height from said first end edge to said second end edge; and each a pair of guide walls extending between said top edge of said cup member and one of said first and second vertical walls.

2. A grease trap device for positioning over the lip of a grill, said device comprising:

a bottom wall being elongate and having a first end edge, a second end edge, a first side edge and a second side edge, a first vertical wall being attached to and extending along the length of said first side edge, a second vertical wall being attached to and extending along the length of said second side edge, said first vertical wall having an increasing height from said first and edge to said second end edge;

a hook member being attached to and extending along a length of an upper edge of said first vertical wall, said hook member including a horizontal portion being attached to and extending away from said vertical wall and a vertical portion being attached to said horizontal portion and extending downward from said horizontal portion, wherein said horizontal portion may be abutted against the lip of the grill such that a wall of the grill is positioned between the vertical portion and the first vertical wall;

a cup member having a base wall and a peripheral wall extending upwardly from said base wall, said peripheral wall having a top edge defining an opening into said cup member, said top edge being attached to said second end edge such that said opening is generally within a plane of said bottom wall, each a pair of guide walls extending between said top edge of said cup member and one of said first and second vertical walls; and wherein said bottom wall is angled downward from said first end edge to said second end edge when said hook member is positioned over the lip of the grill such that grease on said bottom wall flows into said cup member.

* * * * *